(12) United States Patent
Oppici

(10) Patent No.: US 7,422,097 B2
(45) Date of Patent: Sep. 9, 2008

(54) METHOD AND APPARATUS FOR ARRANGING AND ORIENTING PACKAGES

(75) Inventor: Giorgio Oppici, Solignano (IT)

(73) Assignee: A.C.M.I. S.p.A., Fornovo di Taro (IT)

( * ) Notice: Subject to any disclaimer, the term of this patent is extended or adjusted under 35 U.S.C. 154(b) by 176 days.

(21) Appl. No.: 10/533,367

(22) PCT Filed: Jul. 23, 2003

(86) PCT No.: PCT/IT03/00452

§ 371 (c)(1),
(2), (4) Date: Nov. 25, 2005

(87) PCT Pub. No.: WO2004/039705

PCT Pub. Date: May 13, 2004

(65) Prior Publication Data

US 2006/0151293 A1 Jul. 13, 2006

(30) Foreign Application Priority Data

Oct. 31, 2002 (IT) .......................... PR2002A0062

(51) Int. Cl.
*B65G 47/24* (2006.01)
(52) U.S. Cl. .................. 198/377.08; 198/374; 198/440
(58) Field of Classification Search ................. 198/374, 198/440, 377.08
See application file for complete search history.

(56) References Cited

U.S. PATENT DOCUMENTS

| | | | | |
|---|---|---|---|---|
| 3,997,048 A | * | 12/1976 | Hardy | 198/577 |
| 4,004,678 A | * | 1/1977 | Hardy | 198/460.2 |
| 4,016,788 A | * | 4/1977 | Hardy | 83/72 |
| 4,242,025 A | * | 12/1980 | Thibault | 414/792 |
| 4,881,635 A | * | 11/1989 | Raschke | 198/460.2 |
| 5,042,862 A | | 8/1991 | Tuebke | |
| 5,475,449 A | | 12/1995 | Pyle | |
| 5,687,831 A | | 11/1997 | Carlisle | |
| 6,374,984 B1 | * | 4/2002 | Nagler | 198/382 |
| 6,540,063 B1 | * | 4/2003 | Fallas et al. | 198/461.1 |
| 7,000,755 B2 | * | 2/2006 | van Pinxteren et al. | 198/374 |
| 2003/0134019 A1 | * | 7/2003 | Van Pinxteren et al. | 426/523 |

FOREIGN PATENT DOCUMENTS

| | | |
|---|---|---|
| EP | 0 259 733 A1 | 3/1988 |
| JP | 01 216788 | 8/1989 |
| WO | 99/28057 | 6/1999 |

* cited by examiner

*Primary Examiner*—Gene O. Crawford
*Assistant Examiner*—Leslie Nicholson, III
(74) *Attorney, Agent, or Firm*—Pearne & Gordon LLP

(57) ABSTRACT

An apparatus (1) for sorting packages, comprising means (2) for supplying the packages to at least a station (3) for their manipulation and orientation, which is characterised in that the manipulating station (3) comprises at least a manipulator head (7) having at least two degrees of freedom of motion. In particular, the manipulator head (7) is movable by translation according to the axis of an orthogonal Cartesian triad and is movable by rotation about a substantially vertical axis. A method for putting in step packages conveyed by conveyor belts set side by side including varying the speed of said belts.

11 Claims, 4 Drawing Sheets

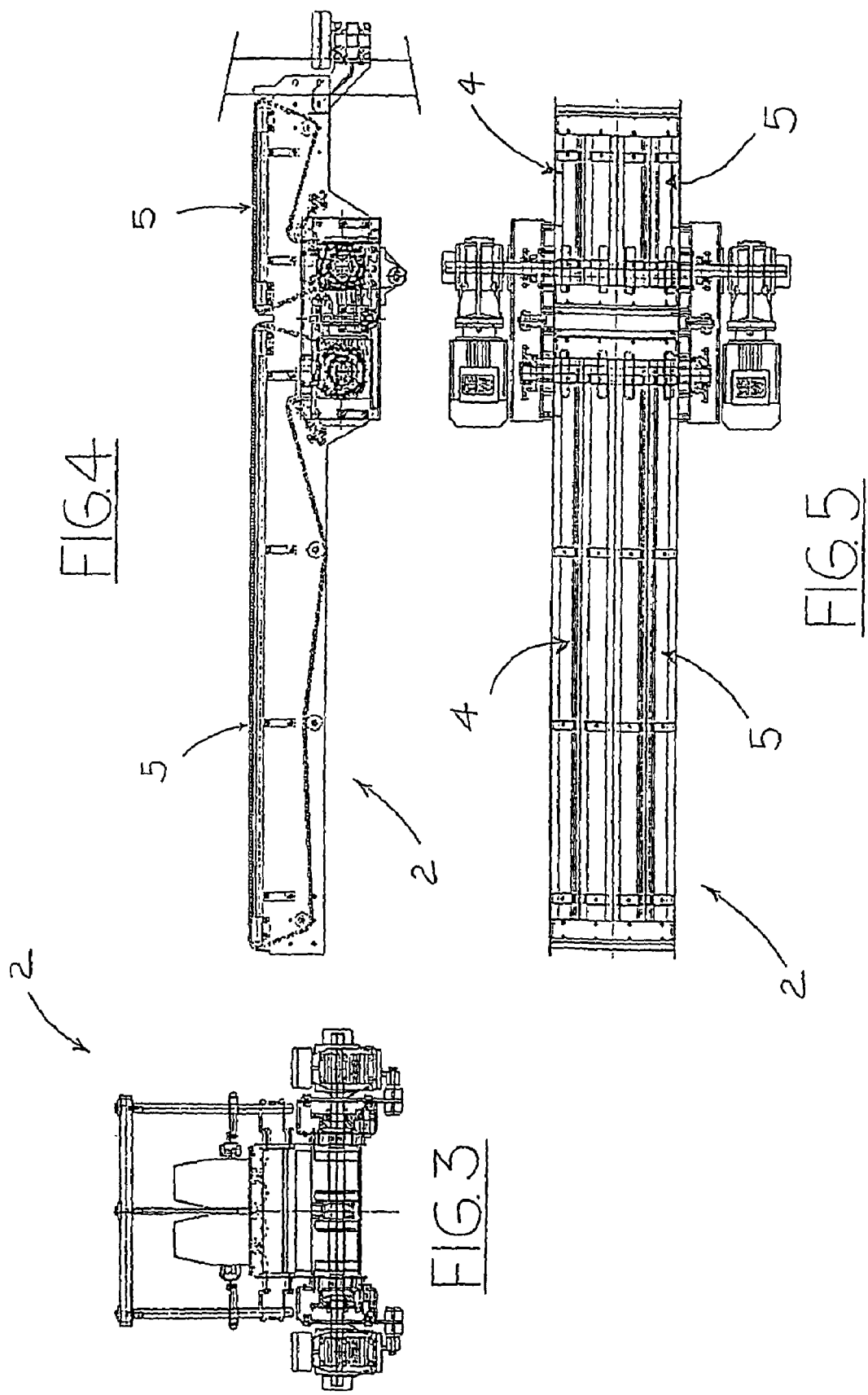

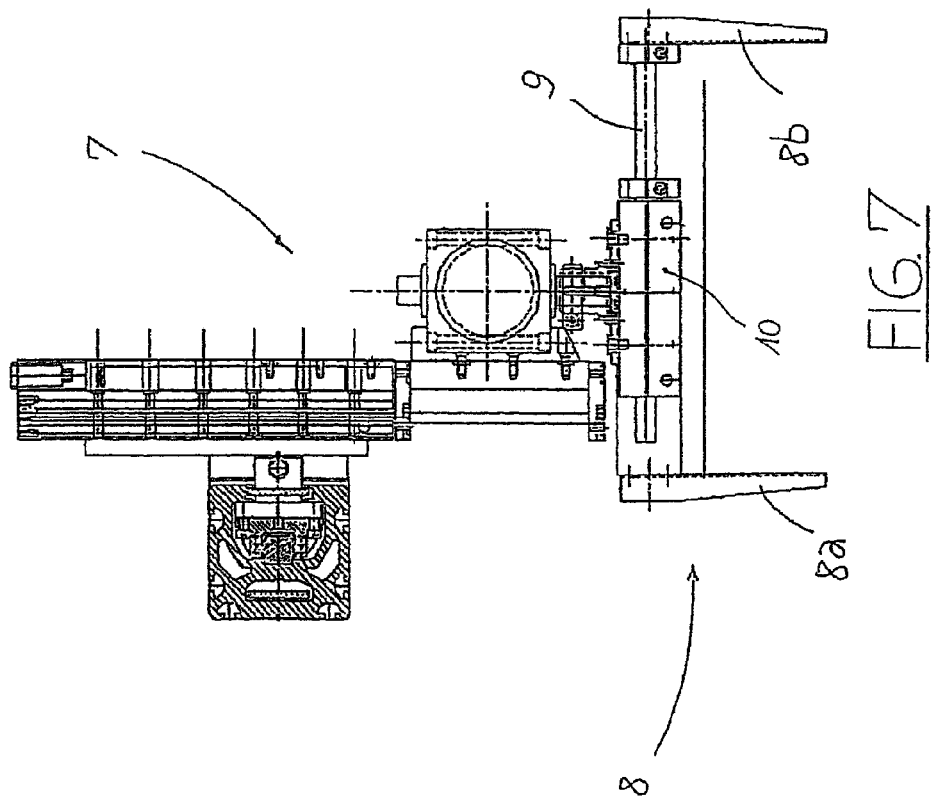
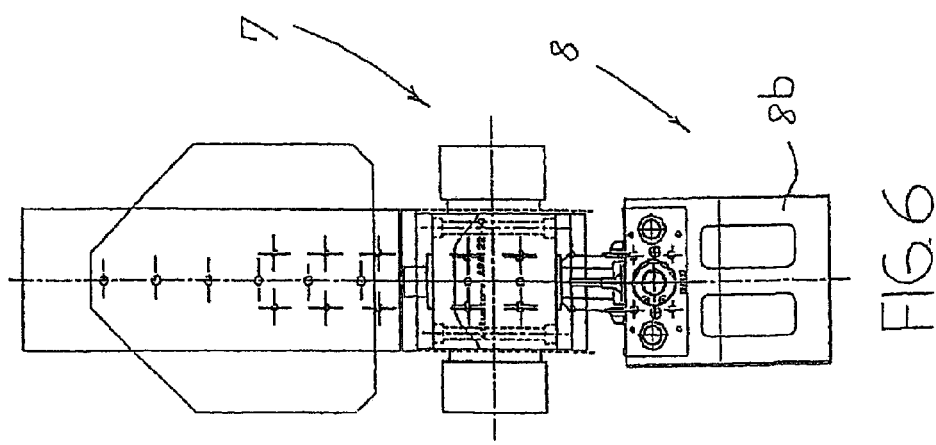

METHOD AND APPARATUS FOR ARRANGING AND ORIENTING PACKAGES

TECHNICAL FIELD AND BACKGROUND ART

The present invention relates to an apparatus for sorting packages, of the type comprising means for supplying the packages to a manipulation and orientation station.

The present invention further relates to a method for putting the packages in step.

In the sector of packaging and palletising plants, a well known need is that of manipulating and/or orienting packages containing products treated on lines for their transfer and/or processing, usually positioned upstream of said manipulating station.

Said requirement is particularly acute in plants for treating containers for drinks, for instance cans and bottles, made of glass or plastic, for containing water, beer or wine. In particular, the packages in question may be crates, cartons, bundles or clusters.

The patent EP 1046598 discloses an apparatus for manipulating packages of containers, typically bottles or cans, in order to arrange them according to a predefined configuration to allow them to be transported on pallets.

This apparatus is provided with a station for aligning and separating the packages, provided with a plurality of parallel and diagonal guides, on each of which slides a grip element. Each grip element takes a package and orients it according to the final configuration to be obtained.

The packages are supplied to the aforesaid station in one or more rows, by means of a conveyor belt.

The velocity of sliding of the grip elements on the diagonal guides is controlled by a processor and it may vary according to the velocity of advance of the conveyor belt, in order to enable the grip elements to follow the various packages and to manipulate them in such a way as to make them assume a correct positioning angle relative to the direction of motion of the belt.

The apparatus described above has the important drawback of requiring as many grip elements are there are rows of packages on the conveyor belt. The grip elements are constrained to move diagonally and therefore they cannot follow packages which simultaneously reach the alignment and separation station. Precisely, said drawback is due to the fact that the grip element have a single actual degree of freedom of motion which corresponds to the diagonal motion along the guide.

In accordance with a second known prior art solution, apparatuses exist which are capable exclusively of rotating the packages by means of fixed impediments against which the packages themselves impact asymmetrically. The asymmetry of the impact causes a rotation of each package about its substantially vertical barycentric axis.

An apparatus of this type has the important drawback of compromising the integrity of the packages and above all of the objects contained therein. This drawback is particularly felt in the beer processing industry, because the packages contain glass bottles within which is present beer that was just pasteurised (and thus is hot) which, along with the low thickness of the glass, considerably increases the fragility of the bottles and the consequent risk of breakage.

DISCLOSURE OF THE INVENTION

An aim of the present invention is to eliminate the aforesaid drawbacks, making available an apparatus for sorting packages and a method which allow to sort and orient the packages according to a wide range of configurations, in order to meet any possible palletisation requirement.

Another aim of the present invention is to propose a sorting apparatus and a method which do not compromise the content of the packages. In particular, an aim of the present invention is to make available a sorting apparatus which can be employed in the bottling plant industry, above all for packages containing bottles made of glass or of another highly fragile material.

A further aim is to obtain the results expressed above, within the context of a rational, reliable constructive solution.

Said aims are fully achieved by the apparatus for sorting packages and by the method of the present invention, which are characterised by the content of the claims set out below and in particular in that the manipulating station of the apparatus comprises at least a manipulator head having at least two degrees of freedom of motion.

The method for putting in step packages conveyed by conveyor belts set side by side is characterised in that it comprises the following steps:

detecting a package that is too far ahead;

measuring the RPM of an actuating motor of a first belt whereon the package positioned too far ahead is located;

increasing a counter according to the RPM of the motor of the first belt;

decreasing the velocity of advance of the first belt according to the value assumed by the counter;

sensing the alignment of the packages;

measuring the RPM of an actuating motor of a second conveyor belt whereon the package that is too far behind is located;

decreasing the counter according to the RPM of the motor of the second belt;

increasing the velocity of advance of the second conveyor belt according to the value assumed by the counter.

BEST MODE FOR CARRYING OUT THE INVENTION

These and other characteristics shall become more readily apparent from the following description of a preferred embodiment illustrated, purely by way of non limiting example, in the accompanying drawing tables, in which.

FIG. 3 shows a front view of an operative component associated with the apparatus of FIG. 1;

Figure 1:
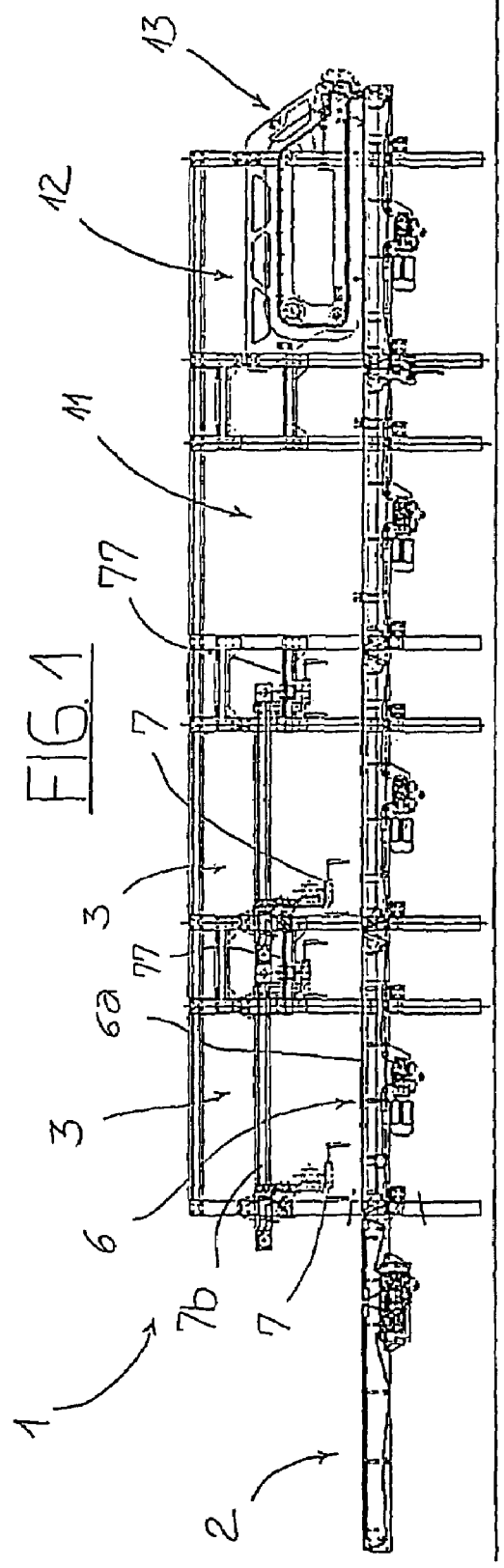
FIG. 1 shows a side view of a sorting apparatus according to the present invention.
Figure 8:
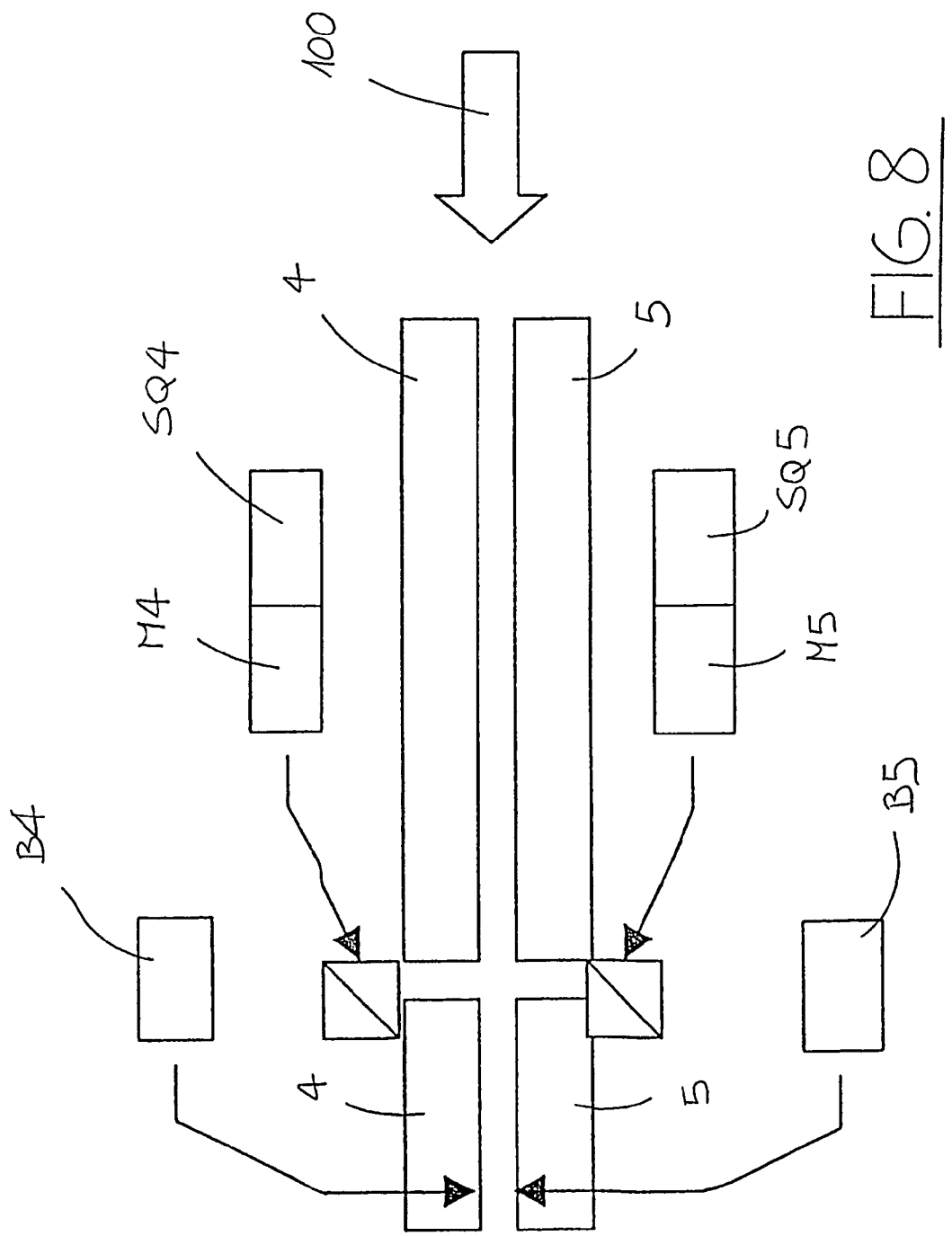

FIGS. 4 and 5 respectively show a side and top view of the operative component of FIG. 3;

FIGS. 6 and 7 respectively show a side and front view of a construction detail of the apparatus of FIG. 1;

FIG. 8 shows a schematic view of the operation of the operative component shown in FIGS. 3, 4 and 5.

Figure 2:
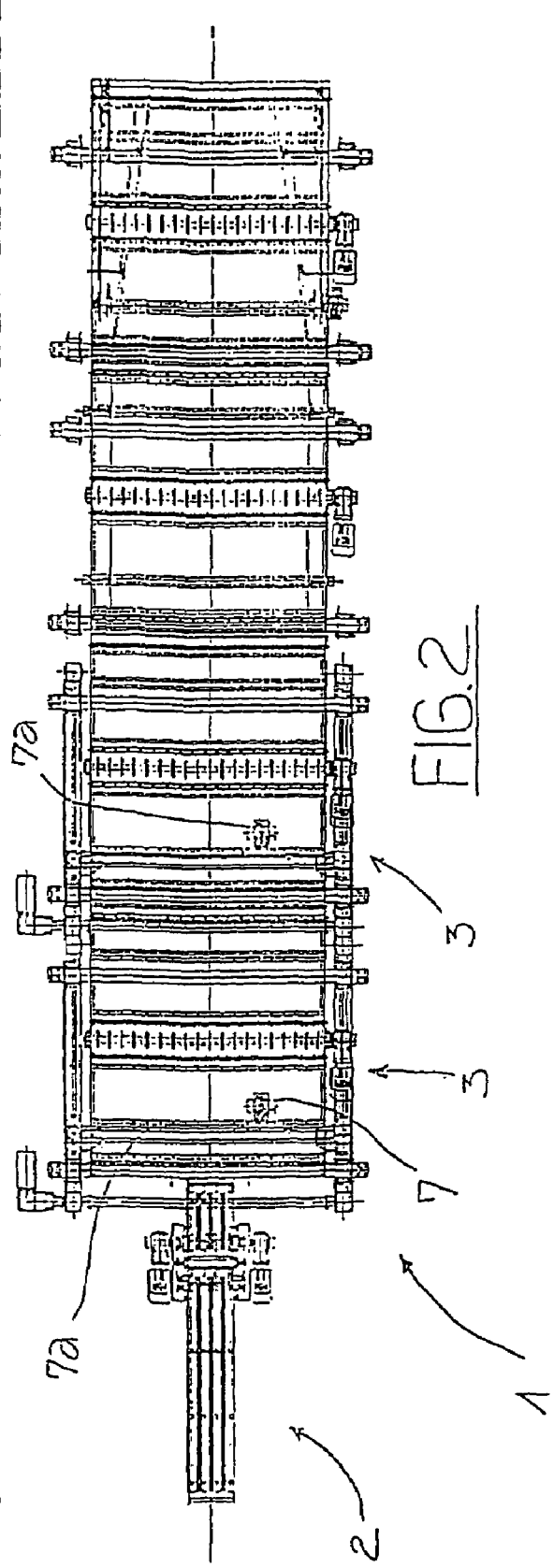
FIG. 2 shows a top view of the apparatus of FIG. 1.

With particular reference to FIGS. 1 and 2, the sorting apparatus is globally indicated with the number 1 and comprises means 2 for supplying the packages to at least a station 3 for manipulating and orienting the packages themselves.

In the illustrated example, the means 2 for supplying the packages comprise a pair of conveyor belts 4, 5 movable with variable and independent speeds, in order to allow putting the packages in step before their entry into the manipulating station 3.

The presence of a pair of conveyor belts allows to supply the packages on two rows, thereby optimising plant productivity, However, by synchronising the speeds of advance of the conveyor belt, it is also possible to place each package on both belts, in such a way as to supply a single row of packages to the manipulating station.

The conveyor belts 4, 5 are positioned externally to the manipulating station 3 and they unload the packages on a subsequent conveyor belt 6 associated with the manipulating station 3 and positioned on an ideal extension of the conveyor belts 4, 5.

The manipulating station 3 originally comprises at least a manipulator head 7 having at least two degrees of freedom of motion. Specifically, in FIG. 1 the manipulator head is illustrated in two different operative positions: in a first operative position the head was distinguished with the number 7, whilst in a second operative position the head was distinguished with the number 77.

In the illustrated embodiment, said head 7 is movable by translation according to the axes of an orthogonal Cartesian triad. Specifically, the head 7 translates in a plane that is parallel to an upper surface 6a of the conveyor belt 6, according to two directions X and Y (not shown); moreover, the head 7 moves along a direction Z (not shown) that is substantially vertical and perpendicular to said plane lying parallel to the upper surface 6a of the belt 6.

The head 7 is also movable by rotation about a substantially vertical axis, to enable the packages to rotate by predefined angular quantities according to the final configuration to be obtained.

Specifically, the head 7 is movable by sliding on a guide 7a, transverse relative to the direction of advance of the conveyor belt 6. The guide 7a in turn translates on rails 7b, according to a direction that is substantially parallel to the direction of advance of the conveyor belt 6.

With reference to FIGS. 6 and 7, the manipulator head 7 comprises grip means 8 to move the packages, driving them on the surface of the conveyor belt 6. In the illustrated example, said grip means are preferably grippers constituted by a pair of gripping appendages 8a, 8b, which can vary their relative distance to adapt the gripper to the dimensions of the packages. In particular, a first appendage 8a is integral with the structure of the manipulator head 7, whilst a second appendage 8b is integral with a rod 9 able to slide within a corresponding cylinder 10.

In the illustrated example, the apparatus 1 is preferably provided with a pair of manipulating stations 3, positioned one immediately after the other and each fitted with its own conveyor belt.

The apparatus 1 is also provided with a station 11 for accumulating the sorted packages, said station also being provided with its own conveyor belt, independent of the conveyor belts described above.

In the preferred embodiment, all conveyor belts described are independent and provided with a dedicated motorisation.

Downstream of the accumulation station 11, there is a station 12, provided with means 13 for thrusting the sorted packages onto a palletiser.

The operation of the invention is as follows:

The belts 4,5 supply the packages to the manipulating station 3, making the pass on the conveyor belt 6 associated to said station.

With reference to FIG. 8, the packages are put in step by means of a pair of photocells facing each other (designated by B4 and B5 in the figure); a pair of sensors (designated by SQ4 and SQ5 in the figure) for counting the RPM of the motors (designated by M4 and M5 in the figure) of each conveyor belt 4,5; a counter (called Z for the sake of simplicity) to calculate the operating velocity of the belts. In the preferred embodiment, the counter Z is internal to a processor (PC). The arrow marked with the number 100 indicates the direction of supply of the packages.

Assuming that the package moved by the belt 4 is ahead of the package moved by the belt 5, as soon as the package ahead arrives in front of the photocell B4, the sensor SQ4 checks the RPM of the motor M4, in order to increase the counter Z.

Evaluating the value assumed by the counter, the speed decrease to be attributed to the motor M4 in order to slow the advance of the belt 4 is calculated. Specifically, the velocity of the belt 4 is obtained by subtracting the velocity of the belt 5 by a quantity that is proportional to the quantity Z.

When a package positioned too far behind arrives in correspondence with the photocell B5, the sensor SQ5 checks the RPM of the motor M5, in order to decrease Z, in such a way as to increase the velocity of the belt 4.

If the value of the counter Z becomes too high (i.e. the packages to be put in step are very distant from each other), the motor M4 will stop operating.

When the counter Z reaches zero, the packages moved by the belts 4 and 5 will be definitively synchronised.

If the sorting apparatus has to work with the package travelling on the two belts at the same time, the velocity of the two belts must be mutually synchronised.

The operation is as follows.

First of all, a master belt is selected, for instance the belt 4, and the velocity of the motor M4 is set.

The counter Z is increased by means of the sensor SQ4 and it is simultaneously decreased by means of the sensor SQ5. The absolute value obtained from said algebraic sum allows to synchronise the velocities of advance of the belts.

Specifically, if the value of Z is positive, then the motor M4 is rotating more rapidly than the motor M5 and therefore the RPM of M5 is increased relative to M4 by a percentage calculated on the basis of the counter Z; if the value is negative, then the motor M5 is rotating more rapidly than the motor M4 and thus the RPM of M5 is decreased relative to M4 by a percentage calculated on the basis of the counter Z.

When the counter Z reaches a value of zero, the belts are travelling as the same velocity. During the movement of the conveyor 6, the packages are followed by the manipulator head 7 which, if necessary, grips them and orients them according to the final configuration to be obtained.

The invention achieves important advantages.

First of all, such an apparatus allows to obtain a very high number of final configurations of the packages, since the manipulator head 7 has one more degree of freedom of motion than the aforementioned prior art. Secondly, the presence of multiple manipulating stations allows to vary the productivity of the apparatus in extremely effective and flexible fashion.

The invention claimed is:

1. An apparatus (1) for sorting packages, comprising means (2) for supplying the packages to at least a manipulating station (3) for their manipulation and orientation, said manipulating station (3) comprising at least a manipulator head (7); at least a belt conveyor (6) associated with the manipulating station (3), the manipulator head (7) being movable by rotating about a substantially vertical axis, for orienting the packages on an upper surface (6a) of the conveyor belt (6) contemporaneously to a movement of the packages caused by an advancing of said conveyor belt (6), characterized in that the manipulator head (7) is movable by translation according to axes of an orthogonal Cartesian triad and said means (2) for supplying the packages comprise a pair of conveyor belts (4,5) movable with variable and independent speeds in order to put the packages in step before their supply to the manipulating station (3), wherein each conveyor belt is associated with:

at least an actuating motor (M4, M5);
at least a photocell (B4, B5) for detecting the presence of a package on a belt;
at least a sensor (SQ4, SQ5) cooperating with a correspondent actuating motor (M4, M5) for counting the RPM of said motor, and
at least a processor for increasing a counter as a function of the RPM of the motor of a first belt (4) whereon a package positioned ahead is detected; decreasing the velocity of advance of the first belt as a function of the value assumed by the counter; decreasing the counter according to the RPM of the motor of a second conveyor belt (5) whereon a package positioned behind is detected; and increasing the velocity of advance of the second conveyor belt as a function of the value assumed by the counter.

2. An apparatus as claimed in claim 1, characterised in that the manipulator head (7) comprises gripping means to displace the packages.

3. An apparatus as claimed in claim 2, characterised in that the gripping means are grippers provided with gripping appendages (8a;8b), a first appendage (8a) being integral with the structure of the manipulator head (7) and a second appendage (8b) being integral with a rod (9) which can slide inside a corresponding cylinder (10) obtained in the structure of the head (7).

4. An apparatus as claimed in claim 2, characterized in that said pair of conveyor belts (4, 5) are positioned externally to the manipulating station (3) and they unload the packages on the belt conveyor (6) associated with the manipulating station (3).

5. An apparatus as claimed in claim 3, characterized in that said pair of conveyor belts (4, 5) are positioned externally to the manipulating station (3) and they unload the packages on the belt conveyor (6) associated with the manipulating station (3).

6. An apparatus as claimed in claim 1, characterized in that it further comprises a guide (7a) transverse relative to a direction of advance of the conveyor belt (6), said guide (7a) translating on rails (7b) according to a direction that is substantially parallel to the direction of advance of the conveyor belt (6), said manipulator head (7) being movable by sliding on said guide (7a).

7. An apparatus as claimed in claim 6, characterized in that said pair of conveyor belts (4, 5) are positioned externally to the manipulating station (3) and they unload the packages on the belt conveyor (6) associated with the manipulating station (3).

8. An apparatus as claimed in claim 1, characterized in that the upper surface (6a) of the conveyor belt (6) is flat and defines a single substantially horizontal plane.

9. An apparatus as claimed in claim 8, characterized in that said pair of conveyor belts (4, 5) are positioned externally to the manipulating station (3) and they unload the packages on the belt conveyor (6) associated with the manipulating station (3).

10. An apparatus as claimed in claim 1, characterized in that said pair of conveyor belts (4, 5) are positioned externally to the manipulating station (3) and they unload the packages on the belt conveyor (6) associated with the manipulating station (3).

11. A method for putting in step packages conveyed by conveyor belts set side by side, comprising the following steps:

detecting the package positioned ahead;
measuring the RPM of an actuating motor (M4) of a first belt (4) whereon the package positioned ahead is located;
increasing a counter as a function of the RPM of the motor of the first belt;
decreasing the velocity of advance of the first belt as a function of the value assumed by the counter;
detecting the package positioned behind;
measuring the RPM of an actuating motor (M5) of a second conveyor belt (5) whereon the package positioned behind is located;
decreasing the counter according to the RPM of the motor of the second belt;
increasing the velocity of advance of the second conveyor belt as a function of the value assumed by the counter.

* * * * *